Sept. 25, 1928.
G. FRANK
CLAMP
Filed Oct. 11, 1926
1,685,696
2 Sheets-Sheet 1
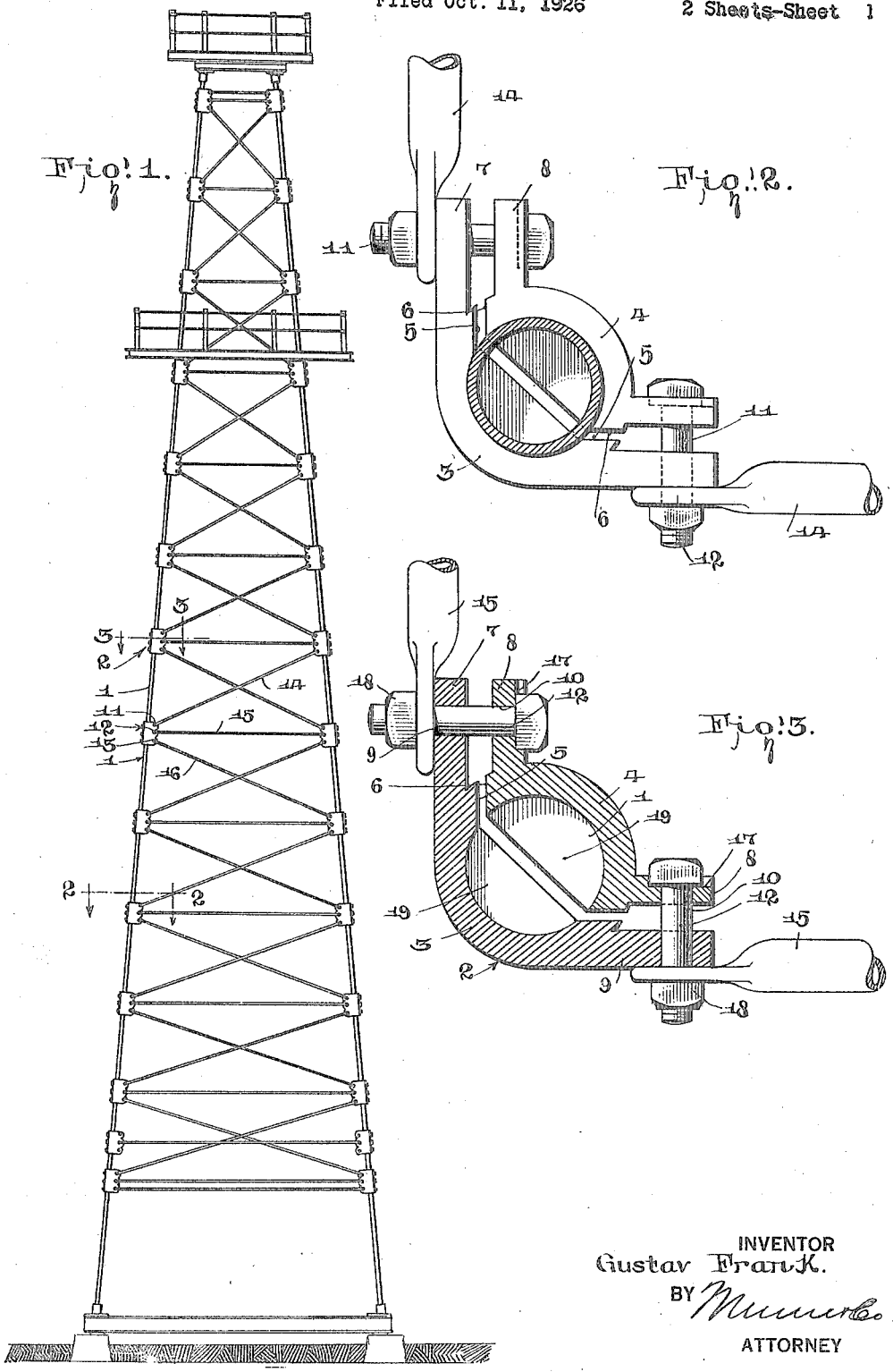
INVENTOR
Gustav Frank.
BY
ATTORNEY Sept. 25, 1928. 1,685,696
G. FRANK
CLAMP
Filed Oct. 11, 1926 2 Sheets-Sheet 2
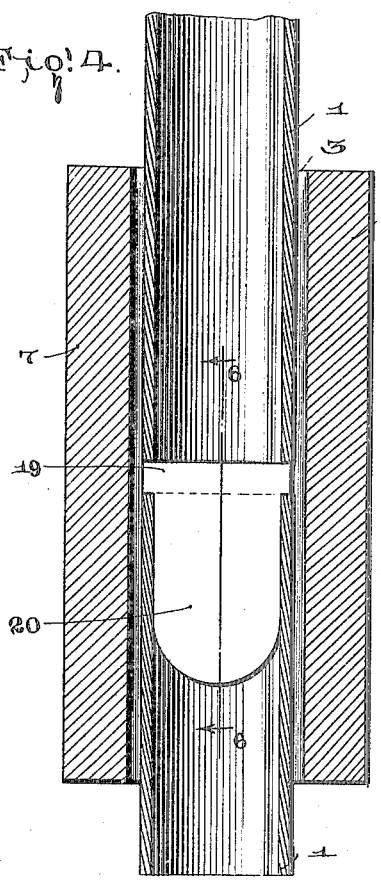
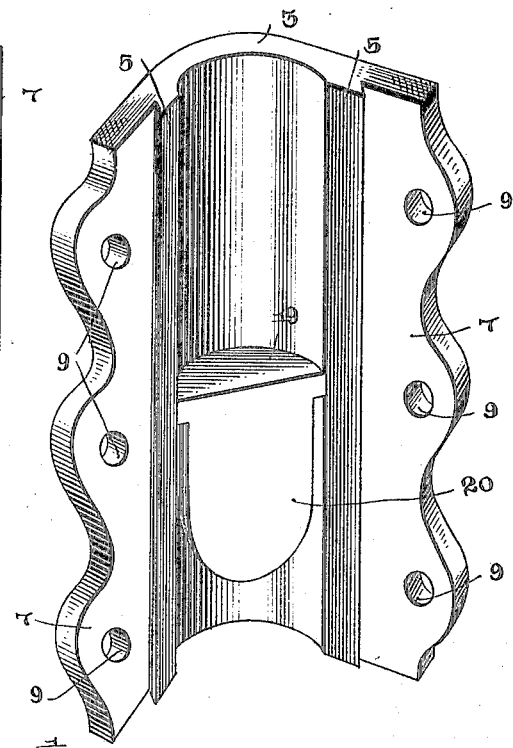
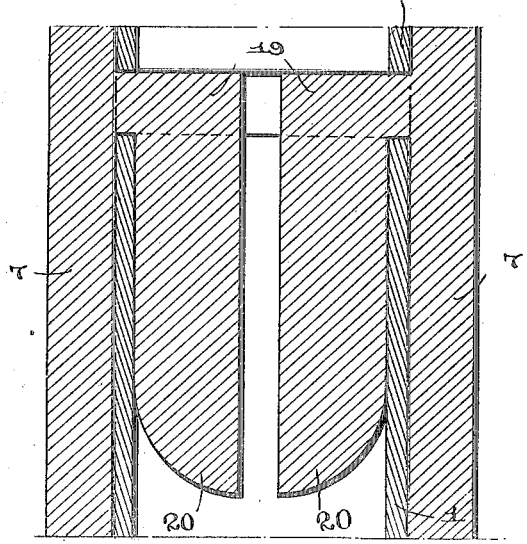
INVENTOR
Gustav Frank
BY
ATTORNEY Patented Sept. 25, 1928.

1,685,696

UNITED STATES PATENT OFFICE.

GUSTAV FRANK, OF WICHITA FALLS, TEXAS.

CLAMP.

Application filed October 11, 1926. Serial No. 141,019.

My invention relates to improvements in clamps for securing together releasable adjacent alined tubular members and it consists in the combinations, constructions and arrangements herein described and claimed.

The improved clamp is particularly well adapted for connecting the adjacent ends of tubular sections of the legs of a derrick or like structure and a general object of the invention is the provision of a clamp which can be applied to or removed from the adjacent ends of tubular sections of a leg of a derrick or like structure with but relatively little labor and in a relatively short time so that an economy will be effected in the time and labor which are required to erect or dismantle a derrick.

A more scpeific object of the invention is the provision of a clamp of the character described which has means engageable with the lower of two adjacent alined substantially upright members so that the members of the clamp will be supported in positions to embrace the adjacent ends of the members that are to be coupled together, and the hands of the workman who is applying the clamp are free for manipulating a wrench or other tool as required to secure the clamp in place.

A further object of the invention is the provision of a clamp of the character described which comprises co-operative members having means for engaging with the lower of two substantially upright adjacent tubular members so that the clamp will be supported in position to overlap approximately equal portions of the adjacent tubular members without there being any necessity of adjusting the members of the clamp longitudinally of such tubular members at the time the members of the clamp are connected with each other in embracing relation to the adjacent ends of the tubular members.

A still further object of the invention is the provision of a clamp of the character described which comprises a pair of co-operative members for embracing the adjacent ends of substantially alined tubular members and having co-operative apertured flanges for the reception of bolts for connecting the members of the clamp to each other and also for connecting the clamp with adjacent structural members such as girts, braces or the like.

Other objects and advantages of the invention will be apparent from the following description considered in conjunction with the accompanying drawings, in which:—

Figure 1 is a side elevation of a derrick having legs formed of tubular sections connected together by means of a clamp embodying the invention, Figure 2 is a relatively enlarged section substantially along the line 2—2 of Fig. 1, Figure 3 is a section similar to Fig. 2, the view being taken substantially along the line 3—3 of Fig. 1, Figure 4 is a vertical section through the adjacent end of two alined tubular members and through one of the members of the clamp by means of which such tubular members are connected, Figure 5 is a perspective view of one of the clamp members or sections, and Figure 6 is a sectional view substantially along the line 6—6 of Figure 4.

In Figure 1 I show a derrick having legs which are formed of alined tubular sections 1 connected together by clamps embodying the invention and generally indicated at 2.

Each of the clamps 2 has a body comprising two co-operative sections 3 and 4, respectively. Each of the sections 3 and 4 has an arcuately curved inner wall and preferably has an arcuately curved outer wall parallel to its inner wall. The adjacent side edges of the sections 3 and 4 of the body of the clamp may be complementarily beveled as indicated at 5 and 6, respectively to provide positive stops. The section 3 of the body of the clamp is the section that is adapted to be disposed on the outer side of the meeting end portions of adjacent tubular members 1 and it therefore will be hereinafter referred to as the outer section of the body of the clamp while the section 4 of the body of the clamp is adapted to be disposed at the inner side of the meeting end portions of adjacent members 1 and will be referred to as the inner section of the body of the clamp. The inner walls of the sections of the body of the clamp preferably extend transversely of the clamp through complementary semi-circles, but the bevel of the side edges 6 of the inner section of the body of the clamp is such that the outer arcuately curved wall of the section 4 does not extend through a complete semi-circle. The meeting edge portions of the sections 3 and 4 have co-operative flanges 7 and 8, respectively, which are parallel with each other when the sections of the body of the clamp are connected together as shown in Figures 2 and 3. The flanges 7 and 8 may have vertically spaced sets of alined transverse openings as indicated at 9 and 10, respectively, in Figure 3. The sections of the body of the particular embodiment of the invention shown in the drawings have three vertically spaced sets of alined openings 9 and 10 respectively adapted for the reception of bolts 11, 12 and 13, respectively, such bolts serving not only to secure the sections of the body of the clamp in clamping relation to the interposed ends of adjacent tubular members 1, but also serving to connect the clamp with adjacent structural members of the derrick or other structure in which the clamp is employed. In Figure 1, the upper bolts 11 are shown as connecting the clamps with the lower ends of upwardly inclined brace rods 14, the bolts 12 are shown as engaging the clamps with girt rods 15 and the bolts 13 are shown as connecting the clamps with downwardly inclined brace rods 16. It will be understood, however, that any suitable number of sets of openings 9 and 10 may be provided in the cooperative flanges of the sections of a clamp embodying the invention for the reception of bolts for connecting the sections of the body of the clamp together and for connecting the clamp with adjacent structural members.

The outer face of the flange 8 of the section 4 of the body of the clamp may have recesses 17 therein in association with the openings 10 for partially receiving the heads of the associated bolts so that such bolts will be held against turning in the openings 10—9 when nuts, as at 18 are screwed onto the outer end portions of the bolts.

Such bolts may be track bolts, which are noncircular, and in that event the openings 10—9 also would be noncircular and the necessity of providing the recesses 17 for engaging with the bolt heads to prevent turning of the bolts would be obviated.

The sections of the body of the clamp are provided intermediate their ends with cooperative complementary transversely fixed spacing members 19, each of which has a tongue 20 depending from its lower side. Each tongue 20 is spaced from the inner wall of the associated section of the body of the clamp as best seen in Fig. 6, thus producing a space between the tongue and the inner wall of the associated clamp for the reception of the adjacent end portion of the lower of the two tubular members which are to be connected by means of the clamp. Each tongue 20 has its outer face curved convexly transversely thereof to fit rather snugly in an approximately half portion of the associated tubular member 1 and the lower end of the tongue 20 may taper as shown, the outer face of the lower end portion of the tongue being rounded off to facilitate its insertion in the tubular member in connection with which it is to be used. The inner face of each of the tongues 20 preferably is plane and is continuous with the inner face of the associated spacing member 19.

From the foregoing description of the various parts of the device, the operation thereof may be readily understood. The sections of the body of the clamp are disposed in embracing relation to the upper end portion of the lower of two adjacent tubular members which are to be coupled together so that the tongues 20 of the body of the clamp enter and engage with said tubular members. The sections of the body of the clamp thus will be maintained in position to receive the lower end portion of the upper of the two tubular members that are to be connected together and the hands of the workman who is making the assembly will be free for the manipulation of suitable tools for connecting the sections of the clamp to each other and to the associated structural members by means of the aforesaid bolts and nuts. Also, the spacing members 19 of the sections of the body of the clamp will serve to position the members of the clamp with respect to the adjacent ends of the two tubular members that are to be connected so that approximately equal portions of the two adjacent tubular members will be embraced by the sections of the body of the clamp when said sections of the body of the clamp have been secured together. Such tubular members will be positively prevented from telescoping under an overload since their adjacent ends are spaced by the members 19.

Another beneficial feature of the clamp as described in the foregoing remarks is the transversely rounded off formation of the outer section of the body of the clamp so that no projecting parts are provided on the clamp body and consequently there is no interference with the operation of a wrench or like tool for manipulation of the nuts of the fastening means for securing the sections of the clamp together. A clamp embodying the invention, therefore, can be secured in place on the adjacent ends of alined tubular members more quickly and easily and with less likelihood of injury to the workman than is possible with any prior clamp of which I am aware at this time. Since the same bolts which connect the sections of the clamp body together also serve to connect the clamp with associated structural elements, it is obvious that an economy in the time and labor which are required to secure the clamp in place and to connect the clamp with associated structural elements will be effected and moreover relatively little material is required to connect the members of a clamp to each other and with a given number of associated structural members.

Obviously the invention is susceptible of embodiments in forms other than that which is illustrated in the accompanying drawings and I therefore consider as my own all such modifications and adaptations thereof as fairly fall within the scope of the appended claims.

I claim:—

1. A clamp comprising a pair of elongated semi-sleeve like sections having the inner faces thereof curved concavely transversely thereof, whereby said sections are adapted to embrace the adjacent ends of substantially alined tubular members, spacer members, one of said spacer members being located within each of said sections intermediate the ends of the sections for engaging with one end of one of the tubular members to position said clamping sections on said tubular members, and retaining tongues extending from said spacer members into one of said tubular members.

2. A clamp comprising a pair of longitudinal sections having the inner faces thereof curved concavely transversely thereof, whereby said sections are adapted to embrace the adjacent ends of substantially alined tubular members, spacer members within said sections intermediate the ends of the sections for engaging with the ends of the tubular members to position said clamping sections on said tubular members, retaining tongues extending from said spacer members into one of said tubular members, said retaining tongues having the faces thereof which are next to the inner wall of the associated clamping member spaced therefrom and curved transversely to correspond substantially with the curvature of the inner wall of the associated tubular member designed to receive said member.

3. A clamp comprising a pair of longitudinal sections having the inner faces thereof curved concavely transversely thereof, whereby said sections are adapted to embrace the adjacent ends of substantially alined tubular members, spacer members within said sections intermediate the ends of the sections for engaging with the ends of said tubular members to position said clamping sections of one tubular member, retaining tongues extending from said spacer members into one of said tubular members, said retaining tongues tapering at their free ends to facilitate entry into a tubular member.

4. A clamp having a body comprising two cooperative elongated sleeve-like sections, each having arcuately curved inner and outer walls, the inner walls of said sections extending substantially through semi-circles, the outer wall of one of said sections being of greater extent transversely thereof than the outer wall of the second section, said second section having longitudinally extending flanges at its edges formed to lie in planes extending substantially radially of said section, the first clamping section having flanges at its outer edges parallel with the flanges of the second section, each of said flanges having a plurality of longitudinally spaced transverse openings, the openings of associated flanges being alined, said alined openings of the flanges being adapted for the reception of fastening elements for connecting said flanges to each other and to adjacent structural members, and solid spacing members arranged in said sections to form abutments for the end of the tubular members to be connected.

GUSTAV FRANK.